US006826516B1

(12) United States Patent
Ito

(10) Patent No.: US 6,826,516 B1
(45) Date of Patent: Nov. 30, 2004

(54) APPARATUS FOR WORKING BUILDING MATERIAL

(75) Inventor: Hiromichi Ito, Minokamo (JP)

(73) Assignee: Kabushikikaisya Enu Shi Enu, Gifu-Ken (JP)

( * ) Notice: Subject to any disclaimer, the term of this patent is extended or adjusted under 35 U.S.C. 154(b) by 0 days.

(21) Appl. No.: 09/529,765

(22) PCT Filed: Aug. 26, 1999

(86) PCT No.: PCT/JP99/04626

§ 371 (c)(1),
(2), (4) Date: Jun. 21, 2000

(87) PCT Pub. No.: WO00/13114

PCT Pub. Date: Mar. 9, 2000

(30) Foreign Application Priority Data

Aug. 26, 1998 (JP) ............................................ 10/257501

(51) Int. Cl.[7] .............................................. G06F 17/50
(52) U.S. Cl. ...................................................... 703/1
(58) Field of Search .................................. 703/2, 6, 1

(56) References Cited

U.S. PATENT DOCUMENTS 5,574,658 A  11/1996  Ito ................................. 703/1

FOREIGN PATENT DOCUMENTS

| JP | 59163665 A | 9/1984 |
|---|---|---|
| JP | 02275579 A | 11/1990 |
| JP | 04291466 A | 10/1992 |
| JP | 04326173 A | 11/1992 |
| JP | 07056970 | 3/1995 |
| JP | 07056970 A | 3/1995 |
| JP | 08036591 | 2/1996 |
| JP | 08036591 A | 2/1996 |
| JP | 08123837 | 5/1996 |
| JP | 08123837 A | 5/1996 |
| JP | 08166979 A | 6/1996 |
| JP | 09319773 A | 12/1997 |
| JP | 10149206 A | 6/1998 |

OTHER PUBLICATIONS

Kim et al., W. Visualized Construction Process on Virtual Reality, Fifth International Conference on Information Visualization, IEEE, Jul. 2001, pp. 684–689.*

Dosch et al., P. Reconstruction of the 3D Structure of a Building from the 2D Drawings of its Floors, Proceedings of the Fifth International Conference on Document Analysis and Recognition, IEEE, Sep. 1999,pp. 487–490.*

Fukai et al., D. PCIS—A Visual Decision Tool for Construction and Design Management, Fifth International Conference on Information Visualization, IEEE, Jul. 2001, pp. 376–381.*

Kamat et al., V.R. Comparison of Simulation–Driven Construction Operations Visualizationand 4D CAD, Proceedings of the Winter Simulation Conference, IEEE, vol. 2, Dec. 2002, pp. 1765–1770.*

Slaughter et al., E.S. Simulation of Structural Steel Erection to Assess Innovations, IEEE Transactions on Engineering Management, vol. 44, No. 2, May 1997, pp. 196–207.*

Papamichael, et al., "Building Design Advisor: Automated Integration of Multiple Simulation Tools," 1997, Elsevier Science B. V.

Alfares, et al., "An Integrated System For Computer–Aided Design and Construction of Reinforced Concrete Buildings Using Modular Forms," 1996, Elsevier Science B. V.

* cited by examiner

*Primary Examiner*—Russell Frejd
(74) *Attorney, Agent, or Firm*—Beyer Weaver & Thomas, LLP

(57) ABSTRACT

Designing of building structures, reexamining designs of the building structures and processing of building structural components of the building structures are integrally conducted based on CAD data formed with a CAD device. A cost estimation table is constructed based on data formed with a CAD program. Furthermore, a strength distribution diagram of selected building structural components, which are selected from a virtual three dimensional model constructed with the CAD program, is formed. Upon examining the cost estimation table and the strength distribution diagram, if the design of the building structure is satisfactory, the structural components are processed with a CAM device.

13 Claims, 5 Drawing Sheets

| | LAST TWO DIGITS(mm) | LAST ONE DIGIT(mm) |
|---|---|---|
| LENGTH | 00~99 | |
| THICKNESS WIDTH | | 0~9 |
| CORRECTED VALUE | 100 | 10 |

<STRUCTURAL COMPONENTS···>  (page3)

| ATTRIBUTES/ WOOD SPECIES | LENGTH (mm) | WIDTH (mm) | THICKNESS (mm) | QUANTITY | VOLUME | UNIT COST | AMOUNT |
|---|---|---|---|---|---|---|---|
| COLUMN A/ CHAMAECYPARIS OBTUSA | 3000 | 130 | 130 | 12 | 0.6084 | 150.000 | 91,260 |
| COLUMN B/ CHAMAECYPARIS OBTUSA | 6020 | 135 | 135 | 10 | 1.1956 | 150.000 | 179,340 |
| COLUMN C/ CHAMAECYPARIS OBTUSA | 3000 | 110 | 130 | 20 | 0.8580 | 150.000 | 128,700 |
| | | | | | | | |

24

APPARATUS FOR WORKING BUILDING MATERIAL

FIELD OF THE INVENTION

This invention relates generally to designing of building structures, and more particularly to a processing system for processing building structural components. In the processing system, a building structure is designed with a CAD (Computer Aided Design) device, and thereafter the data of the CAD device is transferred to a CAM (Computer Aided Manufacturing) device through a communication network such as a LAN (Local Area Network).

BACKGROUND OF THE INVENTION

In conventional methods of construction, frameworks, roof trusses and floor trusses are constructed at a construction site with building structural components, which are precut in a factory based on specified dimensions and specified joint types. This precut system allows the processed building structural components to be assembled at construction sites without requiring any further process of these building structural components, so that a construction period is significantly reduced.

The building structural components are precut in the following sequence. First, data of the frameworks such as columns and beams to be arranged on a foundation, data of the roof trusses, data of the floor trusses, data of openings and material data are inputted into the CAD device. These data are stored as CAD data along with supplemental data (such as data of plotting manner, colors and others) that are previously provided in a CAD program. Among these stored CAD data, data required for precutting of the building structural components, such as shape data and material type data of the building structural components, are printed out on a sheet. Then, these required data are manually inputted into a precut CAD device from the printed data sheet. Furthermore, at this stage, additional data, such as data of joints, data of bolt holes for splicing fittings and data of slits, are also inputted into the precut CAD device. Among these data, the shape data, the material type data and the additional data are used as precut data.

These precut data are transferred from the precut CAD device to a precut CAM device arranged in the factory through a communication line. Then, the precut CAM device cuts the materials based on the shape data of each building structural component.

Since the material type data and the dimension data of each building structural component must be retrieved and printed out from the CAD device and then inputted into the precut CAD device, the operation is tedious and time consuming. Furthermore, if a designer changes the design of the building structure after reexamining the design or after considering customer's request, the inputted CAD data should be modified. In such case, the data of the precut CAD device should also be modified, resulting tedious and time consuming modifying operation. Furthermore, these data are inputted into the precut CAD device by man power, so that there is always a possibility of input mistakes. Therefore, very careful data input work is required to avoid the input mistakes.

Furthermore, the changes in the design of the building structure after reexamining the design or after considering customer's request are often made as a result of considering strength data or cost data of the building structural components after these data are computed. Therefore, these data must be computed separately, resulting additional work.

The present invention addresses these disadvantages. An objective of the present invention is to provide an integral processing system capable of designing the building structures, reexamining designs of the building structures, and processing the building structural components of the building structures based on the CAD data formed with a CAD device.

SUMMARY OF THE INVENTION

To achieve the objective of the present invention, a processing system for processing building structural components constituting a building structure includes a first station comprising: an input means for inputting at least shape data and relative position data of the building structural components; a two-dimensional diagram constructing means for constructing a two-dimensional diagram, wherein the two-dimensional diagram constructing means first constructs a virtual three-dimensional model of the building structural components based on the various data inputted from the input means and also supplemental data arranged in a CAD program, and then constructs the two-dimensional diagram by projecting selected building structural components, which are selected from the building structural components of the virtual three-dimensional model, onto a plane: a display means for displaying the two-dimensional diagram constructed by the two-dimensional diagram constructing means on a display screen; a storage means for storing CAD data for constructing the virtual three-dimensional model constructed by the two-dimensional diagram constructing means; and a strength computing means for computing strengths of the selected building structural components based on the CAD data retrieved from the storage means; and a second station comprising a processing means for processing each of the building structural components based on the CAD data retrieved from the storage means, wherein the processing means is interconnected with the first station through a communication line.

Alternatively, the processing system for processing building structural components constituting a building structure includes a first station comprising: an input means for inputting at least shape data and relative position data of the building structural components; a two-dimensional diagram constructing means for constructing a two-dimensional diagram, wherein the two-dimensional diagram constructing means first constructs a virtual three-dimensional model of the building structural components based on the various data inputted from the input means and also supplemental data arranged in a CAD program, and then constructs the two-dimensional diagram by projecting selected building structural components, which are selected from the building structural components of the virtual three-dimensional model, onto a plane; a display means for displaying the two-dimensional diagram constructed by the two-dimensional diagram constructing means on a display screen; a storage means for storing CAD data for constructing the virtual three-dimensional model constructed by the two-dimensional diagram constructing means; and a cost estimating means for estimating costs of the building structural components based on the CAD data retrieved from the storage means; and a second station comprising a processing means for processing each of the building structural components based on the CAD data retrieved from the storage means, wherein the processing means is interconnected with the first station through a communication line.

BRIEF DESCRIPTION OF THE DRAWINGS

FIG. 4 is a descriptive view showing part of a cost estimation table.

DETAILED DESCRIPTION OF THE PREFERRED EMBODIMENTS

A processing system for processing building structural components of building structures (hereinafter referred as a processing system) in accordance with one embodiment of the present invention will now be described with reference to FIGS. 1 to 7.

Figure 1:
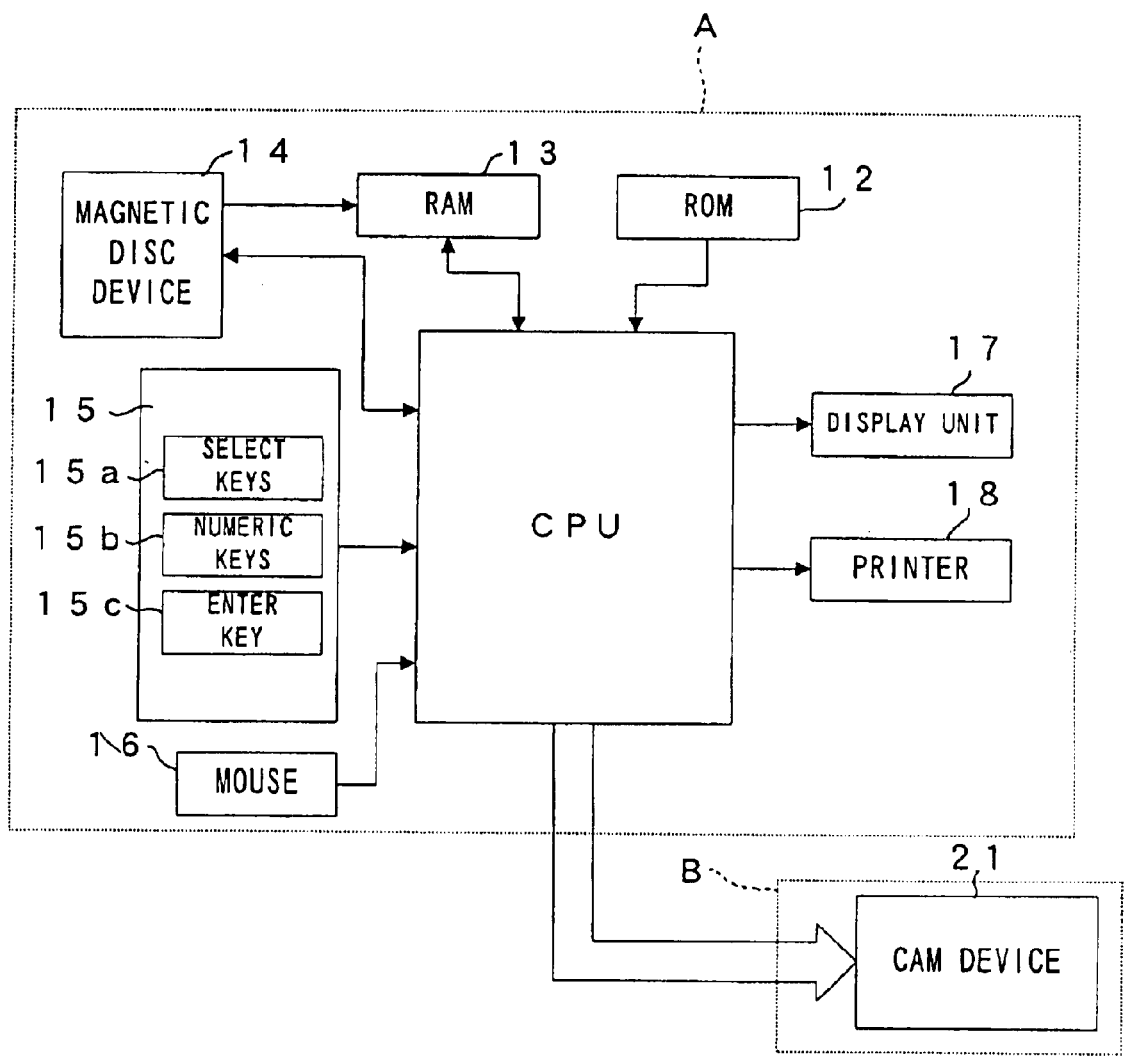
FIG. 1 is a block diagram showing an electrical structure according to an embodiment of the present invention.

As shown in FIG. 1, the processing system includes a CPU (Central Processing Unit) 11 that is interconnected with a ROM (Read Only Memory) 12, a RAM (Random Access Memory) 13, a magnetic disk device 14, an input device 15, a mouse 16, a display unit 17 and a printer 18. The CPU 11 and the described peripheral devices constitute a first station A. The CPU 11 is further interconnected with a CAM device 21 that constitutes a second station B through a communication line A program for controlling operation of the entire processing system, a data base management program for managing a data base, a network processing program for controlling the communication network, an OA processing program for managing common functions (such as Japanese input function and print function) of various programs are stored in the ROM 12. The RAM 13 is a rewritable memory for temporarily storing various information required for operations of the CPU 11. A CAD program for designing the building structural components, a cost estimation program for estimating costs of the building structural components based on the data of the designed building structural components, and a strength computation program for computing strengths of the building structural components are stored in the magnetic disk device 14.

Furthermore, the CAD data, which is formed by the CAD program, is stored in the magnetic disk device 14. The CPU 11 transfers the CAD data from the magnetic disk device 14 to the RAM 13 when the cost estimation program or the strength computation program are executed.

Various instructions and data are inputted into the CPU 11 through the input device 15. The input device 15 includes select keys 15a, numeric keys 15b and an enter key 15c. The select keys 15a are used to select one of the CAD program, the cost estimation program and the strength computation program for execution, or are used to select any desired process. The numeric keys 15b are used to enter new data. The enter key 15c is used to execute the selected program or process and to define data contents. The mouse 16 is an auxiliary device of the input device 15 and can provide functions similar to that of the select keys 15a and the enter key 15c by moving a mouse cursor to a directive box displayed on a display screen of the display unit 17 and then pressing a button switch.

The display unit 17 displays a CAD diagram, such as a virtual three dimensional model of a building structure, on its display screen based on the CAD data of the CAD program retrieved from the RAM 13. The display unit 17 further displays a cost estimation table formed with the cost estimation program, and also a strength distribution diagram 23 formed with the strength computation program. The printer 18 prints out various information, such as the virtual three dimensional model and the cost estimation table displayed on the display screen of the display unit 17. The CAM device 21 is used to process materials based on the process data and is controlled by a CPU (not shown) arranged in the CAM device 21.

Figures 2, 3:
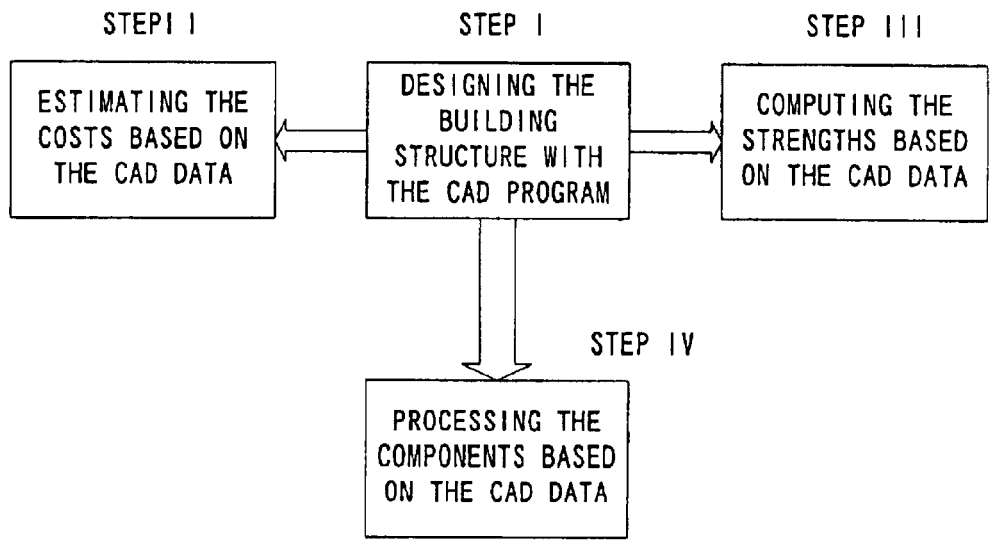
FIG. 2 is a block diagram showing steps of the same embodiment.
FIG. 3 is a table showing relationships between dimensions and their corrected values.

With reference to FIG. 2, a first step I will now be described. In step I, a building structure is designed with the CAD program, and the data of the designed building structure is stored as the CAD data. First, the CPU 11 retrieves the CAD program from the magnetic disk device 14 and transfers it to the RAM 13. By operating the input device 15 or the mouse 16, the CAD program stored in the RAM 13 is invoked on the display screen of the display unit 17, and shape data, relative position data, load data, and connection process data, such as data of joints, data of bolt holes for splicing fittings and data of slits, are inputted. Also, in this embodiment, the data that are not directly associated with the structure, i.e., specification data (such as types, installation areas and sizes) of roof materials, wall materials, floor materials, and interior components, such as stairs, windows and doors, are inputted for use in the cost estimation with the cost estimation program described further below. Furthermore, supplemental data (such as data of material types (wood species), plotting manner and display colors of the building structural components) provided in the CAD program are selected to provide the CAD data that allows construction of the virtual three dimensional model. The CPU 11 temporarily stores the CAD data in the RAM 13. Thereafter, the CPU 11 stores the CAD data in the magnetic disk device 14.

A second step II of FIG. 2 for constructing the cost estimation table with the cost estimation program based on the CAD data will now be described. The CPU 11 retrieves the cost estimation program from the magnetic disk device 14 and transfers it to the RAM 13. The CPU 11 also retrieves the data that are associated with the structure, i.e., the shape data and material type (wood species) data contained in the CAD data, from the magnetic disk device 14, and transfers these data to the RAM 13. Furthermore, the data that are not directly associated with the structure, i.e., the specification data of the roof materials, the wall materials, the floor materials, and the interior components, such as the stairs, the windows and the doors, are also retrieved from the magnetic disk device 14, and are transferred to the RAM 13.

With reference to FIG. 3, the cost estimation program includes a table T1 showing relationships between the actual dimensions of the building structural components and the corrected dimensions of the building structural components used for cost estimation purpose. The actual dimensions of the building structural components are corrected to the corrected dimensions of the building structural components based on the table T1. For example, if the actual dimensions (length: width: thickness) of a column B are 6020 mm: 135 mm: 135 mm, the corrected length will be 6100 mm, the corrected width will be 140 mm, and the corrected thickness will be 140 mm. Since the specification data of the roof materials, the wall materials, the floor materials, and the interior components, such as the stairs, the windows and the doors are selected from those of standard products in step I, the costs of the roof materials, the wall materials and the floor materials are determined based on the selected standard products and their installation areas. Furthermore, the costs of the interior components, such as the stairs, the windows and the doors are determined based on the selected standard products and their sizes.

FIG. 4 shows part of the exemplary cost estimation table 24. In this embodiment, unit cost per one cubic meter is provided for each material types (wood species). In the cost estimation table 24, although the column B is indicated with the actual dimensions, the corrected dimensions of the column B described above are used when the volume and the cost of the column B are computed. For the column B, although the actual volume is 1.09714 cubic meter per piece, the corrected volume is 1.1956 cubic meter per piece when it is corrected in the manner described above. Therefore, the displayed cost of the column B, which is based on the corrected volume, is higher than the actual cost of the column B, which is based on the actual volume. The cost of each building structural component, the cost of each attribute group (such as a group of columns or a group of beams), or the cost of the entire building structural components can be computed separately.

In addition to the costs of the structural components, the cost of each major component other than the structural components can be computed from the specification data of the interior components, and the sub-total cost and the total cost of these major components other than the structural components can be computed.

A third step III of FIG. 2 for constructing the strength distribution diagram 23 based on the CAD data with the strength computation program will now be described. The CPU 11 retrieves the strength computation program from the magnetic disk device 14 and transfers it to the RAM 13. The CPU 11 retrieves the shape data, the relative position data and the load data, which are contained in the CAD data, from the magnetic disk device 14 and transfers them to the RAM 13.

The CPU 11 then constructs the virtual three-dimensional model of the building structure based on the shape data and the relative position data. In this embodiment, a plan cross sectional view, which is obtained by horizontally cutting the virtual three-dimensional model of the building structure, is displayed on the display screen of the display unit 17 as the two-dimensional diagram.

After examining attributes of the building structural components required for the building structure, desired load data of the floors and desired load data of the walls are inputted. Alternatively, original settings of these load data can be used without any changes.

Figure 5:
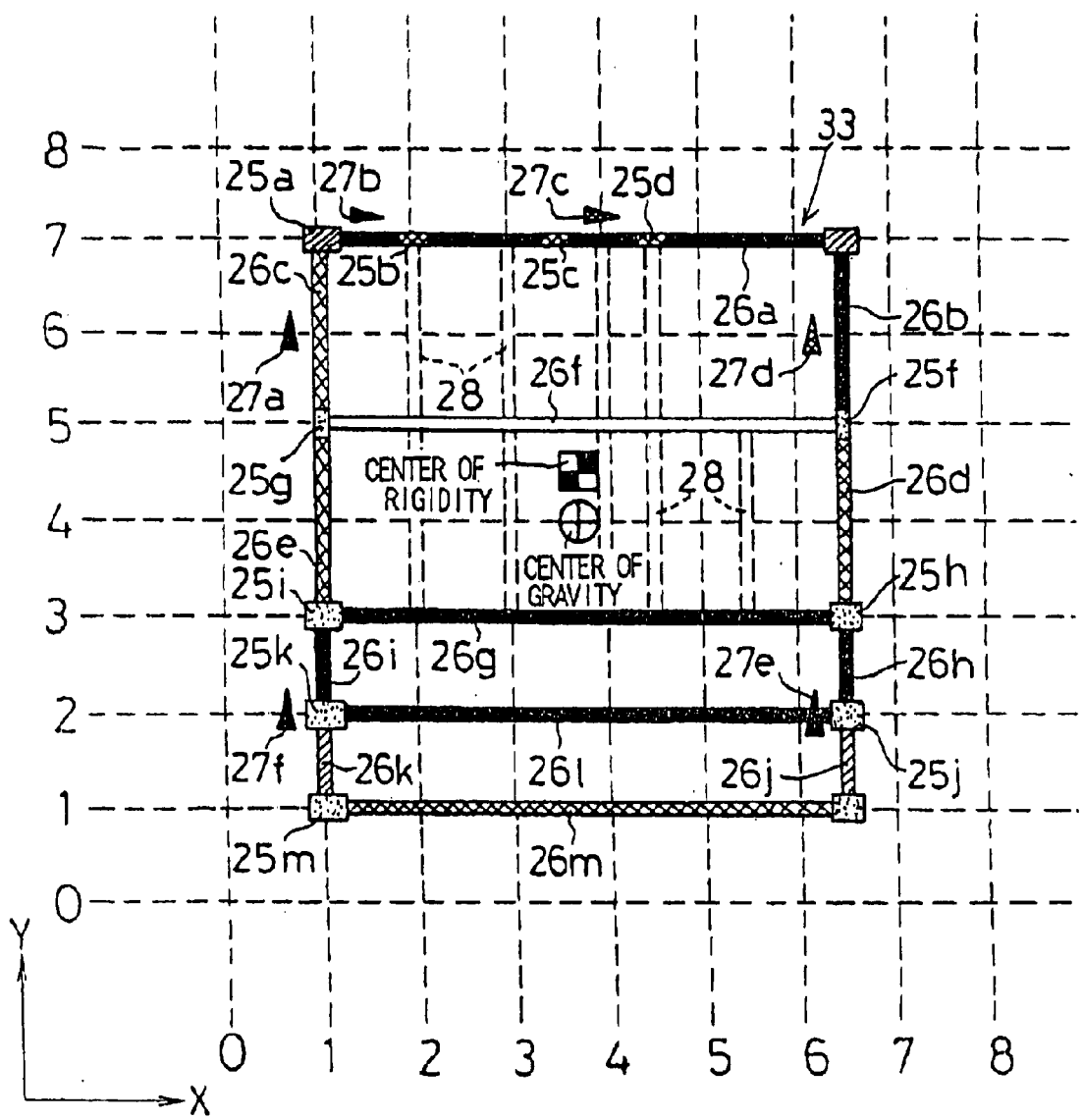
FIG. 5 is a descriptive view of a strength distribution diagram displayed on a display screen.

The strength computation is conducted by operating the input device 15 or the mouse 16. That is, stress values of columns 25a–25m, beams 26a–26m and braces 27a–27f, which are subjects of the strength computation, are computed. Then, the strength distribution diagram 23 is displayed on the display screen of the display unit 17, as shown in FIG. 5. In the strength distribution diagram 23, the columns 25a–25m, the beams 26a–26m and the braces 27a–27f are shown with corresponding colors that are determined based on the computed stress values.

Figure 6:
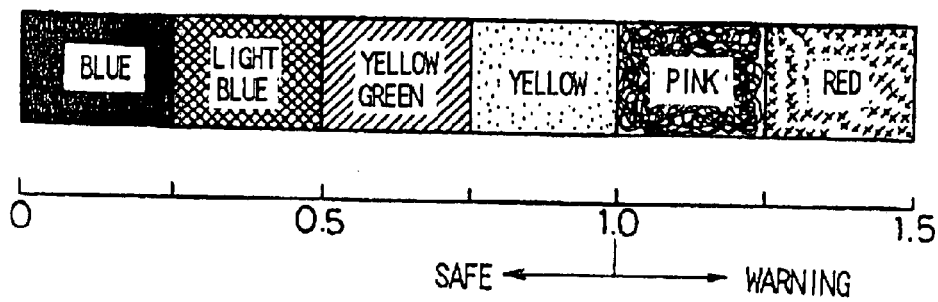
FIG. 6 is a table showing relationships between the strengths and corresponding colors thereof.
Figure 7:
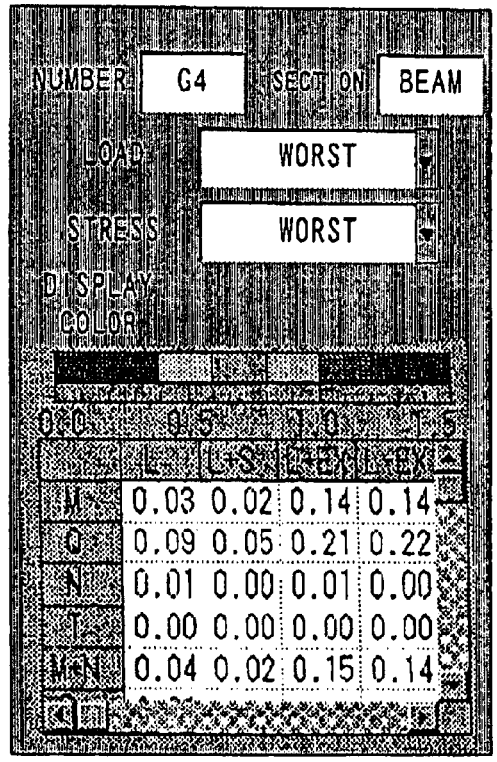
FIG. 7 is a table showing attributes of one building structural component that is arranged in the strength distribution diagram displayed on the display screen.

As shown in FIGS. 6 and 7, the color of each component may vary depending on the computed stress value of the component, and therefore the strength of the component is indicated with the respective color. In this embodiment, six colors can be used depending on the stress value of the component, as shown in FIG. 6. Among these colors, blue indicates the greatest strength (the smallest stress value), and red indicates the smallest strength (the largest stress value).

The strengths are decreased in the order blue>light blue>yellow green>yellow>pink>red. The relationships between the colors and the stress values can be changed as desired. For example, although blue is initially set for a stress value range of 0–24, this stress value range for blue can be changed to 0–0.49. This change can be conducted on a table shown in FIG. 7 by operating the mouse 16.

Stress types computed herein include bending stress (M), sharing stress (Q), compressive stress (N), tensile stress (T), bending stress+compressive stress (M+N) and strain ( ) of each building structural component, and bending stress (jM), shearing stress (jQ), compressive stress (jN), tensile stress (jT) and bending stress+compressive stress (jM+N) of a joint of each building structural component.

The load data for computing the stress values include fixed load (own weight of the component+total weight of three standard adults 180 kg: L), fixed load+snow load (L+S), fixed load+X-direction seismic force (L+±EX), fixed load+Y-direction seismic force (L+±EY), fixed load+X-direction wind pressure (L+±WX), fixed load+Y-direction wind pressure (L+±WY) and fire load (fire). Stress values (a total of 121 values) are derived from combinations of all of the described stresses and all of the described loads for each building structural component that is a subject of the strength computation.

As shown in FIG. 7, the attributes of each building structural component arranged in the strength distribution diagram 23 can be displayed on the display screen by operating the input device 15 or the mouse 16. In this embodiment, as an example, computed stress values for the various load data of the beam 28a (G4) are shown. Furthermore, in the strength distribution diagram 23, the worst load data (indicated as "worst" in FIG. 7) and the worst stress value (also indicated as "worst" in FIG. 7) of each building structural component are used as parameters for determining the colors of the building structural components in the default setting. That is, if one computed stress value of any building structural component is larger than the rest of the computed stress values of the same building structural component, this component is displayed with the color that corresponds with the larger computed stress value even if the other computed stress values are smaller than this larger stress value. Besides the "worst" none, the parameter can be changed to any one, such as the fixed load+the snow load (L+S).

The strength distribution diagram 23 is then printed out through the printer 18.

As described above, the cost estimation table 24 is first constructed with the cost estimation program based on the CAD data formed with the CAD program, and the strength distribution diagram 23 is then constructed with the strength computation program.

The designers or customers can use these cost estimation table 24 and the strength distribution diagram 23 as references for determining the designs of the building structures. If it is determined that any building structural component shown in the strength distribution diagram 23 has a relatively low safety level, the dimensions of the building structural component can be adjusted to increase the strength of the building structural component. To achieve this adjustment, the corresponding CAD data of this building structural component is changed with the CAD program. Furthermore, changes in the costs due to this adjustment can be checked by retrieving and executing the cost estimation program and printing out the new cost estimation table 24.

As shown in the cost estimation table 24, for example, one species of Japanese cypresses called Chamaecyparis obtusa is used for the bases of the building structure. Since this tree is relatively expensive, less expensive Japanese cypress species called Thujopsis dolabrata can be used for the bases of the building structure. To achieve this change, the corresponding CAD data is changed through the CAD program. Furthermore, changes in the costs due to this adjustment can be checked by retrieving and executing the cost estimation program and printing out the new cost estimation table 24.

After the CAD data is established in the first station A, the wood species data, the shape data and the connection process data of the building structural components contained in the CAD data are transferred to the CAM device 21 through the communication line 2 Then, in step VI of FIG. 2, the CPU (not shown) in the CAM device 21 processes wood materials based on these process data.

The described embodiment provides the following advantages.

Since the CAD data can be directly transferred to the CAM device, it is not necessary to input the precut data into the CAM device manually, and the possibility of the input mistakes is advantageously eliminated. Therefore, once the design is established, the wood materials can be immediately processed, so that the process is accelerated.

The cost estimation table 24 and the strength distribution diagram 23 can be easily constructed based on the CAD data.

The CAD data can be adjusted based on the cost estimation table 24 and the strength distribution diagram 23. After the adjustment of the CAD data, the cost estimation table 24 and the strength distribution diagram 23 can be easily reconstructed based on the adjusted CAD data. Therefore, for example, if the customer demands use of less expensive materials, new cost estimation can be made immediately. Furthermore, after the structural design is established based on the cost estimation table 24 and the strength distribution diagram 23, the CAD data can be instantaneously transferred to the CAM device 21, so that the process is accelerated.

If the customer demands design modifications, such as arrangement of a new window in the wall, a column, that should be removed for installation of the window, could be eliminated from the design, and lintels and upper and lower frames for the window could be provided. As a result, the CAD data should be modified to meet the customer's demand. In a case of such structural modifications, a new cost estimation table and a new strength distribution diagram 23 can be produced immediately based on the CAD data, so that discussion of the design between the designer and the customer can be promoted.

The estimated cost indicated in the cost estimation table is slightly higher than the actual cost for providing cost tolerance. Therefore, even if the cost is slightly increased within this cost tolerance, the customer will not be asked to pay more and will not be surprised with a bill asking more than the estimated cost.

Since the columns, the beams and the braces serving as the building structural components are colored with the colors indicating the strengths corresponding with the computed stress values of these building structural components, and are displayed on the two-dimensional strength distribution diagram 23, the strengths of these building structural components are visually directly appealed to a viewer with the colors unlike the prior art where only stress values are displayed as numerals, so that the strengths of the building structural components can be more easily recognized with the present invention. Furthermore, since the differences in the strengths of the building structural components can be seen as the differences in the colors of the building structural components, the differences in the strengths of the building structural components can be more easily recognized in comparison to the prior art.

The described embodiment can be modified as follows.

In the described embodiment, the data that are associated with the structure, i.e., the shape data and the material type (wood species) data, are retrieved by the cost estimation program, and the data that are not directly associated with the structure, i.e., the specification data of the roof materials, the wall materials, the floor materials, and the interior components, such as the stairs, the windows and the doors, are also retrieved simultaneously. Then, the cost estimation is conducted based on these data.

In addition to these data, the data of other components, such as the foundation, built-in furniture and a built-in cloakroom, could be optionally inputted to allow the cost estimation of these components.

In the described embodiment, all data are inputted through the CAD program. However, the data having no direct influences on the construction of the virtual three dimensional model, such as the specification data of the interior components, can be inputted when the cost estimation program is executed.

In the described embodiment, both the cost estimation table 24 and the strength distribution diagram 23 are constructed. Alternatively, only one of the cost estimation table 24 and the strength distribution diagram 23 can be constructed.

The estimated costs of the building structural components indicated in the cost estimation table 24 are higher than the actual costs of the building structural components. Alternatively, these estimated costs can be equal to or lower than the actual costs.

In the described embodiment, the various programs and data are transferred from the magnetic disk device 14 to the RAM 13. Alternatively, the programs and the data can be transferred from other external storage device such as a flexible disk, a CD-ROM disk, a magneto-optical disk or the like, to the RAM 13. Furthermore, the data can be transferred through a data communication network such as a LAN (Local Area Network), WAN (Wide Area Network) or the Internet.

The strengths of the building structural components can be displayed with other sets of colors that are different from the described set of colors, and the number of colors contained in each set of colors can be changed as desired. Furthermore, the strength levels of the building structural components can be displayed with various line types or with various shades ranging from black to white. Furthermore, any marks corresponding with the strengths of the building structural components can be superimposed on the displayed building structural components.

The described types of loads and stresses in the described embodiment are merely examples. In this embodiment, these loads and stresses are obtained as the most universal strength determining conditions, and the types of loads and/or stresses can be increased or decreased.

The printout is not mandatory. Therefore, the printer is not essential element of the present invention. In a case of storing the data, any storage means can be used. Examples of the storage means include magnetic disk devices, RAMs, flexible disks, CD-ROM disks, magneto-optical disks and so on. Accordingly, the present embodiments are to be considered as illustrative and not restrictive, and the invention is not to be limited to the details given herein, but may be modified within the scope and equivalents of the appended claims.

What is claimed is:

1. A processing system for processing building structural components constituting a building structure, said processing system comprising:
   a first station comprising:
      an input means for inputting at least shape data and relative position data of said building structural components;
      a two dimensional diagram constructing means for constructing a two-dimensional diagram, wherein said two-dimensional diagram constructing means first constructs a virtual three-dimensional model of said building structural components based on said shape data and relative position data inputted from said input means and also supplemental data arranged in a CAD program, and then constructs said two-dimensional diagram by projecting selected building structural components, which are selected from said building structural components of said virtual three-dimensional model, onto a plane;
      a display means for displaying said two-dimensional diagram constructed by said two-dimensional diagram constructing means on a display screen;
      a storage means for storing CAD data for constructing said virtual three-dimensional model constructed by said two-dimensional diagram constructing means; and
      a strength computing means for computing strength of said selected building structural components based on said CAD data retrieved from said storage means; and
   a computer aided manufacturing means for manufacturing each of said building structural components based on said CAD data retrieved from said storage means, wherein said computer aided manufacturing means is interconnected with said first station through a communication line.

2. A processing system for processing building structural components according to claim 1, wherein said first station further comprises a cost estimating means for estimating costs of said building structural components based on said CAD data retrieved from said storage means.

3. A processing system for processing building structural components according to claim 1, wherein said strengths are grouped into a plurality of different bands based on magnitudes of said strengths, wherein a strength level display mode is assigned to each of said bands.

4. A processing system for processing building structural components according to claim 1, wherein said two-dimensional diagram constructing means projects a cross section of said virtual three-dimensional model onto said plane, wherein said cross section of said virtual three-dimensional model is obtained by cutting said virtual three-dimensional model at a desired position.

5. A processing system for processing building structural components according to claim 3, wherein each of said strength level display modes is represented by a respective color in said two-dimensional diagram.

6. A processing system for processing building structural components constituting a building structure, said processing system comprising:
   a first comprising:
      an input means for inputting at least shape data and relative position data of said building structural components;
      a two-dimensional diagram constructing means for constructing a two-dimensional diagram, wherein said two-dimensional diagram constructing means first constructs a virtual three-dimensional model of said building structural components based on said shape data and relative position data inputted from said input and also supplemental data arranged in a CAD program, and then constructs said two-dimensional diagram by projecting selected building structural components, which are selected from said building structural components of said virtual three-dimensional model, onto a plane;
      a display means for displaying said two-dimensional diagram constructed by said two-dimensional diagram constructing means on a display screen;
      a storage means for storing CAD data for constructing said virtual three-dimensional model constructed by said two-dimensional diagram constructing means; and
      a cost estimating means for estimating costs of said building structural components based on said CAD data retrieved from said storage means; and
   computer aided manufacturing means for cutting each of said building structural components based on said CAD data retrieved from said storage means, wherein said computer aided manufacturing means interconnected with said first station through a communication line.

7. A processing system for processing building structural components according to claim 6, wherein said first station further comprises a strength computing means for computing strengths of said selected building structural components based on said CAD data retrieved from said storage means.

8. A processing system for processing building structural components according to claim 7, wherein said strengths are grouped into a plurality of different bands based on magnitudes of said strengths, wherein a strength level display mode is assigned to each of said bands.

9. A processing system for processing building structural components according to claim 6, wherein said two-dimensional diagram constructing means projects a cross section of said virtual three-dimensional model onto said plane, wherein said cross section of said virtual three-dimensional model is obtained by cutting said virtual three-dimensional model at a desired position.

10. A processing system for processing building structural components according to claim 8, wherein each of said strength level display modes is represented by a color in said two-dimensional diagram.

11. A processing system for processing building structural components according to claim 6, wherein said costs estimated by said cost estimating means are different from costs of said building structural components that are computed based on actual data of said respective building structural component.

12. A processing system for processing building structural components constituting a building structure, said processing system comprising:
   a first station comprising:
      an input for inputting at least shape data and relative position data of said building structural components;
      a two-dimensional diagram constructing means for constructing a two-dimensional diagram, wherein said two-dimensional diagram constructing means first constructs a virtual three-dimensional model of said building structural components based on said shape data and relative position data inputted from said input means and also supplemental data arranged in a CAD program, and then constructs said two-dimensional diagram by projecting selected building structural components, which are selected from said building structural components of said virtual three-dimensional model, onto a plane, said two-dimensional diagram constructing means also projects a cross section of said virtual three-dimensional model onto said plane, wherein said cross section of said virtual three-dimensional model is obtained by cutting said virtual three-dimensional model at a desired position;

a display means for displaying said two-dimensional diagram constructed by said two-dimensional diagram constructing means on a display screen;

a storage means for storing CAD data for constructing said virtual three-dimensional model constructed by said two-dimensional diagram constructing means; and a strength computing means for computing strength of said selected building structural components based on said CAD data retrieved from said storage means; and a second station comprising a processing means for processing each of said building structural components based on said CAD data retrieved from said storage means, wherein said processing means is interconnected with said first station through a communication line.

13. A processing system for processing building structural components constituting a building structure, said processing system comprising:

a first station comprising:

an input means for inputting at least shape data and relative position data of said building structural components;

a two-dimensional diagram constructing means for constructing a two-dimensional diagram, wherein said two-dimensional diagram constructing means first constructs a virtual three-dimensional model of said building structural components based on said shape data and relative position data inputted from said input means and also supplemental data arranged in a CAD program, and then constructs said two-dimensional diagram by projecting selected building structural components, which are selected from said building structural components of said virtual three-dimensional model, onto a plane;

a display means for displaying said two-dimensional diagram constructed by said two-dimensional diagram constructing means on a display screen;

a storage means for storing CAD data for constructing said virtual three-dimensional model constructed by said two-dimensional diagram constructing means; and a cost estimating means for estimating costs of said building structural components based on said CAD data retrieved from said storage means, wherein said costs estimated by said cost estimating means are different from actual costs of said building structural components that are computed based on actual shape data of said respective building structural components; and a second station comprising a processing means for processing each of sad building structural components based on said CAD data retrieved from said storage means, wherein said processing means is interconnected with said first station through a communication line.

* * * * *